United States Patent [19]

Reik

[11] Patent Number: 4,541,514
[45] Date of Patent: * Sep. 17, 1985

[54] FRICTION CLUTCH AND DIAPHRAGM SPRING THEREFOR

[75] Inventor: Wolfgang Reik, Bühl, Fed. Rep. of Germany

[73] Assignee: Luk Lamellen und Kupplungsbau GmbH, Bühl, Fed. Rep. of Germany

[*] Notice: The portion of the term of this patent subsequent to Apr. 30, 2002 has been disclaimed.

[21] Appl. No.: 398,637

[22] Filed: Jul. 15, 1982

[30] Foreign Application Priority Data

Feb. 10, 1982 [DE] Fed. Rep. of Germany ....... 3204557

[51] Int. Cl.<sup>4</sup> ......................... F16D 13/44; F16F 1/34
[52] U.S. Cl. .................................. 192/70.27; 192/89 B
[58] Field of Search ................. 192/70.27, 89 B; 267/161, 162, 163, 181

[56] References Cited

U.S. PATENT DOCUMENTS

| 2,117,482 | 5/1938 | Klix | 192/70.27 X |
| 3,712,435 | 1/1973 | Kraus | 192/70.27 |

FOREIGN PATENT DOCUMENTS

| 1752253 | 9/1957 | Fed. Rep. of Germany . |  |
| 1103690 | 3/1961 | Fed. Rep. of Germany . |  |
| 1198214 | 8/1965 | Fed. Rep. of Germany | 192/89 B |
| 1212363 | 3/1966 | Fed. Rep. of Germany | 192/89 B |
| 1475272 | 3/1969 | Fed. Rep. of Germany | 192/89 B |
| 3004277 | 8/1981 | Fed. Rep. of Germany . |  |
| 2311221 | 12/1976 | France | 192/89 B |

Primary Examiner—Rodney H. Bonck
Attorney, Agent, or Firm—Peter K. Kontler

[57] ABSTRACT

A diaphragm spring wherein the circumferentially complete outer marginal portion surrounds an annulus of holes constituting the enlarged outer portions of closed slots whose narrower inner portions extend inwardly toward but short of the tips of prongs which surround the central opening of the spring and are separated from one another by radially outwardly extending open slots overlapping the inner portions of the closed slots so as to establish an undulate circumferentially complete annular tension spring radially inwardly of the marginal portion. Each pair of neighboring open slots can flank one or more closed slots. The diaphragm spring can be used in single- or multiple-disc friction clutches.

19 Claims, 7 Drawing Figures

FRICTION CLUTCH AND DIAPHRAGM SPRING THEREFOR

CROSS-REFERENCE TO RELATED CASE

The diaphragm spring which is disclosed in the present application is somewhat similar to that which is described and claimed in the commonly owned copending application Ser. No. 398,717 filed by me on July 15, 1982 for "Diaphragm spring for use in friction clutches and the like".

BACKGROUND OF THE INVENTION

The present invention relates to diaphragm springs or cup springs of the type wherein a circumferentially complete outer marginal portion or rim surrounds an annulus of fingers or prongs extending toward the centrally located opening of the spring.

German Auslegeschrift No. 1,103,690 discloses a diaphragm spring wherein the prongs are separated from one another by elongated slots having enlarged outermost portions adjacent to the rim. The inner end portions of the prongs are subjected to a separate hardening treatment so that their hardness exceeds that of other parts of the spring. The enlarged portions of the slots can resemble circular or oval openings, or they may have other configurations such as openings which are bounded in part by parallel edge faces, in part by outwardly diverging edge faces and in part by substantially semicircular edge faces. Diaphragm springs of the just outlined type are often utilized in friction clutches wherein the rim of the spring abuts against a pressure plate and the inwardly extending prongs cooperate with a release bearing or an analogous device which effects the engagement or disengagement of the clutch. An intermediate portion of the diaphragm spring in a friction clutch is normally confined between two ring-shaped seats where the spring can pivot during or as a result of axial displacement of the tips of its prongs. The seats engage the respective sides of the diaphragm spring in the region of radially outermost parts of the aforementioned enlargements of slots between the prongs, and the prongs act not unlike levers which cause the spring to pivot between the seats when the condition of the clutch is to be changed.

OBJECTS AND SUMMARY OF THE INVENTION

An object of the invention is to provide a novel and improved diaphragm spring which can store larger quantities of energy than heretofore known diaphragm springs containing the same quantities of material.

Another object of the invention is to provide a diaphragm spring which can store energy in parts that, in conventional diaphragm springs, merely serve as a means for effecting a change in the condition (conicity) of the spring.

A further object of the invention is to provide a novel and improved distribution of slots and other forms of voids in a diaphragm spring for use in friction clutches or the like.

An additional object of the invention is to provide a diaphragm spring of lightweight design which can store the same or larger quantities of energy than a conventional diaphragm spring of identical size and weight.

Another object of the invention is to provide a novel and improved method of making a diaphragm spring of the above outlined character.

A further object of the invention is to provide a device, such as a friction clutch, which embodies the improved diaphragm spring.

An additional object of the invention is to provide a novel and improved method of prolonging the useful life of a diaphragm spring.

Another object of the invention is to produce a diaphragm spring with substantial savings in material and in such a way that the spring exhibits characteristics which are not achievable by conventional springs.

A further object of the invention is to provide a diaphragm spring wherein the capacity or ability to store energy is not limited to the outer marginal portion of the spring.

An additional object of the invention is to provide a diaphragm spring wherein elastic energy can be stored in several circumferentially complete zones of the spring.

Another object of the invention is to provide a diaphragm spring wherein the inner portion is protected against peak stresses and wherein such inner portion is capable of "breathing" when the spring is in use.

A further object of the invention is to provide the diaphragm spring with novel and improved means for enhancing its capacity to store energy.

One feature of the invention resides in the provision of a diaphragm spring which comprises a circumferentially complete outer marginal portion and a second portion defining a substantially centrally located opening and having an annulus of prongs whose free end portions or tips are adjacent the opening. The second portion of the spring is formed with an annulus of open slots which alternate with the prongs and with closed elongated outer slots which are disposed radially outwardly of the tips of the prongs (i.e., they do not extend all the way to the opening) and each of which has an enlarged outer portion inwardly adjacent to the outer marginal portion. At least one closed slot is disposed between each pair of neighboring open slots, as considered in the circumferential direction of the spring, and the outer ends of the open slots overlap the inner ends of the closed slots, as considered in the radial direction of the spring. The outer portions of the closed slots can constitute hole-like enlargements of the closed slots, and each closed slot further includes an inner portion whose maximum width, as considered in the circumferential direction of the spring, is less than the maximum width of the respective outer portion. The width of the inner portions of closed slots may be a small fraction of the maximum width of the respective outer portions; at any rate, the maximum width of the outermost parts of inner portions of the closed slots at most equals the width of the innermost parts of the outer portions of the closed slots. In many instances, the width of the inner portions of closed slots (as considered in the circumferential direction of the spring) will be constant or nearly constant all the way from the locus of communication with the respective outer portion to the innermost part of such inner portion. At the very least, it is advisable (at least in most instances) to provide the diaphragm spring with closed slots whose inner portions have a constant width in the region where such inner portions overlap with the adjacent open slots.

The outer portions of the closed slots form an annulus which is inwardly adjacent to the outer marginal portion of the spring and whose inner diameter is not less than the outer diameter of the annulus of open slots, i.e., the outermost parts of the open slots are located radially inwardly of the innermost parts of enlarged outer portions of the closed slots. Preferably, the outer diameter of the annulus of enlarged outer portions of the closed slots exceeds the outer diameter of the annulus of open slots by at least 15 percent. The outer portions of closed slots can constitute hole-like apertures of circular or nearly circular outline whose width (as considered in the circumferential direction of the spring) can be a multiple of the width of the inner portions of the respective closed slots. As mentioned above, the width of the inner portions of closed slots can be at least substantially constant. The width of the open slots can also constitute a small fraction of the width of enlarged outer portions of the closed slots, and the width of each open slot can be constant all the way from the opening to the outermost part of the respective open slot.

The prongs of the second portion of the diaphragm spring can have a substantially constant width, as considered in the circumferential direction of the spring, at least in those regions where the open slots overlap with the neighboring closed slots. The inner portion of the spring comprises bridges which are disposed in the regions of overlap between the open slots and the neighboring closed slots, and the width of such bridges can be at least substantially constant. The arrangement may be such that the pairwise arranged edge faces which flank the open slots are at least substantially parallel to the inner portions of the neighboring closed slots, at least in the regions where the open slots overlap the neighboring closed slots.

The number of closed slots can exceed the number of open slots; it is then preferred that each pair of neighboring open slots flank a plurality of (e.g., two) closed slots.

The enlarged outer portions of the closed slots alternate with webs or ribs which are integral with the outer marginal portion of the diaphragm spring and which are further integral with a circumferentially complete (annular) tension spring formed by the aforementioned bridges in the regions of overlap between the open slots and the neighboring closed slots. The tension spring is integral with (and can be said to include a part of) the prongs.

Another feature of the invention resides in the provision of a friction clutch having a cover, a pressure plate, a pair of annular seats provided between the cover and the pressure plate, and a diaphragm spring disposed between the seats and having a circumferentially complete outer marginal portion located radially outwardly of the seats and engaging with the pressure plate. The diaphragm spring further comprises a plurality of prongs disposed inwardly of the seats (i.e., within the confines of the seats) and having tips defining an opening, open slots alternating with the prongs and closed slots including enlarged outer portions inwardly adjacent to the marginal portion and disposed outwardly of the open slots which latter partially overlap the closed slots, as considered in the radial direction of the diaphragm spring. Each pair of neighboring open slots flanks at least one closed slot, and the clutch further comprises fastener means (e.g., rivets) extending through the enlarged outer portions of some or all of the closed slots to secure the spring (and preferably also the seats) to the cover, and actuating means (e.g., a release bearing) for tilting the spring between the seats, preferably through the medium of the prongs. The enlarged outer portions of the closed slots can resemble or constitute holes, and the innermost portions of the closed slots extend toward but short of the opening which is surrounded by the tips of the prongs.

A further feature of the invention resides in the provision of a friction clutch, particularly a multiple-plate clutch, which comprises a pair of axially movable pressure plates, a pair of clutch plates flanking the pressure plates, and a diaphragm spring disposed between the pressure plates and including a radially outermost marginal portion engaging one of the pressure plates, a second portion located radially inwardly of the marginal portion and engaging the other pressure plate, and a third portion located inwardly of the second portion and including an annulus of prongs whose tips define a substantially centrally located opening. The diaphragm spring is formed with open slots which alternate with the prongs and with closed slots including enlarged outer portions disposed inwardly of the marginal portion and outwardly of the open slots. The closed slots further have inner portions extending inwardly of the respective enlarged outer portions toward but short of the opening. The open slots overlap the inner portions of the closed slots, and each pair of neighboring open slots flanks at least one closed slot. The enlarged outer portions of the closed slots can constitute or resemble holes forming an annulus in the second portion of the diaphragm spring. The second portion preferably includes webs or ribs disposed between the enlarged outer portions of the closed slots and engaging the other pressure plate. At least one of the second and third portions of the diaphragm spring can constitute or comprise a circumferentially complete (annular) tension spring which is integral with the webs as well as with the prongs.

An additional feature of the invention resides in the provision of a friction clutch, such as a pull clutch, which comprises a housing or cover, a pressure plate, and a diaphragm spring disposed between the cover and the pressure plate and including a circumferentially complete radially outermost marginal portion engaging a seat of the cover, a second portion which is located inwardly of the marginal portion and engages with the pressure plate, and a third portion including an annulus of prongs disposed inwardly of the second portion and having tips defining an opening. The diaphragm spring has open slots which alternate with the prongs and closed slots having enlarged outer portions inwardly adjacent to the marginal portion. The closed slots further have inner portions which partially overlap the open slots and terminate short of the opening. Each pair of open slots flanks at least one closed slot, and the clutch further comprises actuating means for flexing the spring relative to the pressure plate, preferably through the medium of the prongs, so as to terminate the application of pressure against the cover and against the pressure plate.

The novel features which are considered as characteristic of the invention are set forth in particular in the appended claims. The improved diaphragm spring itself, however, both as to its construction and the mode of using the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
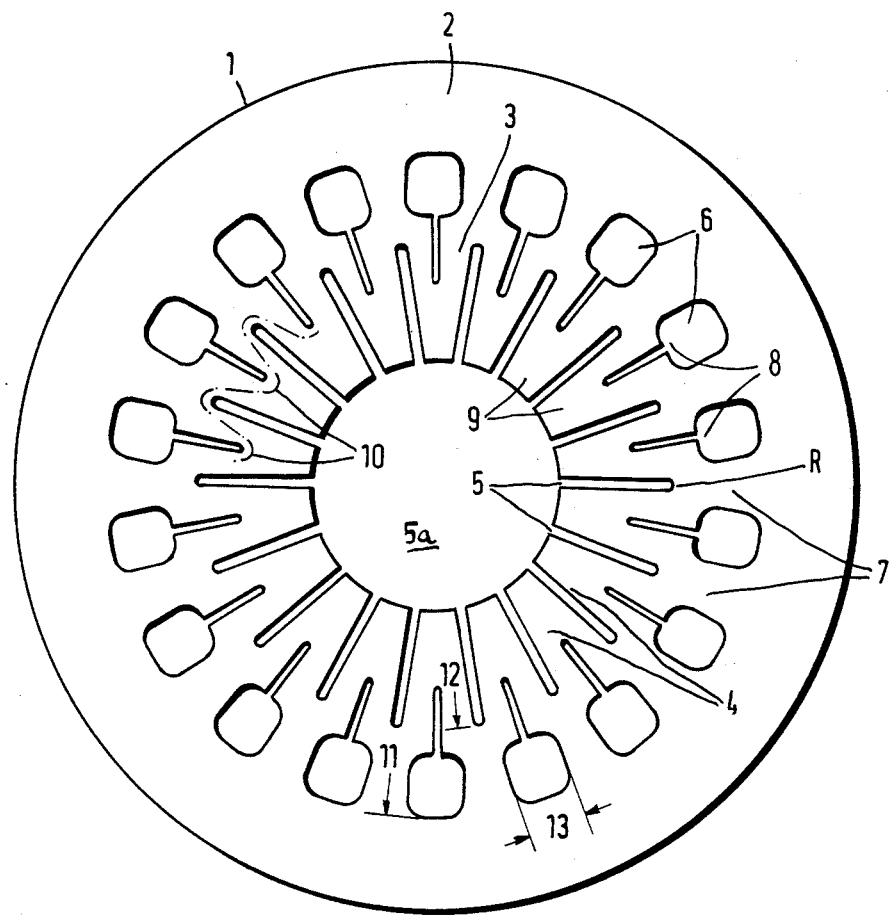
FIG. 1 is an elevational view of a diaphragm spring which embodies one form of the invention.

The diaphragm spring or cup spring 1 which is shown in FIG. 1 comprises a circumferentially complete outer marginal portion or rim 2 and a second or inner portion 3 which is disposed radially inwardly of the rim 2 and is formed with two annuli of slots including open inner slots 5 alternating with radially extending fingers or prongs 4 and closed outer slots each having an enlarged outer portion in the form of a nearly circular hole 6 and a much narrower radially inwardly extending inner portion 8. The free inner end portions or tips 9 of the prongs 4 define and surround a centrally located opening 5a which communicates with the open slots 5. The width 13 of holes 6 of the closed slots, as considered in the circumferential direction of the spring 1, is a multiple of the width of the inner portions 8. The holes 6 form an annulus which is inwardly adjacent to the rim 2 and whose outer diameter 11 exceeds the outer diameter 12 of the annulus of open slots 5 by at least 15 percent. The smallest diameter of the annulus consisting of inner portions 8 of closed slots is smaller than the diameter 12, i.e., the inner portions 8 of the closed slots overlap the outer portions of the open slots 5, as considered in the radial direction of the spring 1.

The holes 6 of the closed slots are separated from each other by an annulus of radially disposed ribs or webs 7 which are integral with the rim 2 as well as with a meandering or undulate zone 10 of the inner portion 3, such zone 10 constituting a circumferentially complete annular tension spring R which is inwardly adjacent to the rim 2. The formation of the spring R is due to the fact that the innermost parts of inner portions 8 of the closed slots terminate short of the opening 5a, i.e., short of the tips 9 of the prongs 4. In the embodiment of FIG. 1, each pair of neighboring open slots 5 flanks the inner portion 8 of a single closed slot, and the inner portions 8 are located midway between the neighboring open slots 5.

The spring R is defined by the open slots 5 and by the inner portions 8 of the closed slots and is integral with the webs or ribs 7 between the holes 6 of the closed slots. The spring R is further integral with the prongs 4 which can be said to constitute a third or innermost portion of the spring 1 and a constituent of the second portion 3.

The width of the open slots 5 may but need not equal the width of inner portions 8 of the closed slots, and each such width can be a small fraction of the width 13 of a hole 6. In the spring 1, the width of each open slot 5 is constant from the innermost to the outermost part thereof, and the same holds true for the width of the inner portions 8 of the closed slots.

Figure 2:
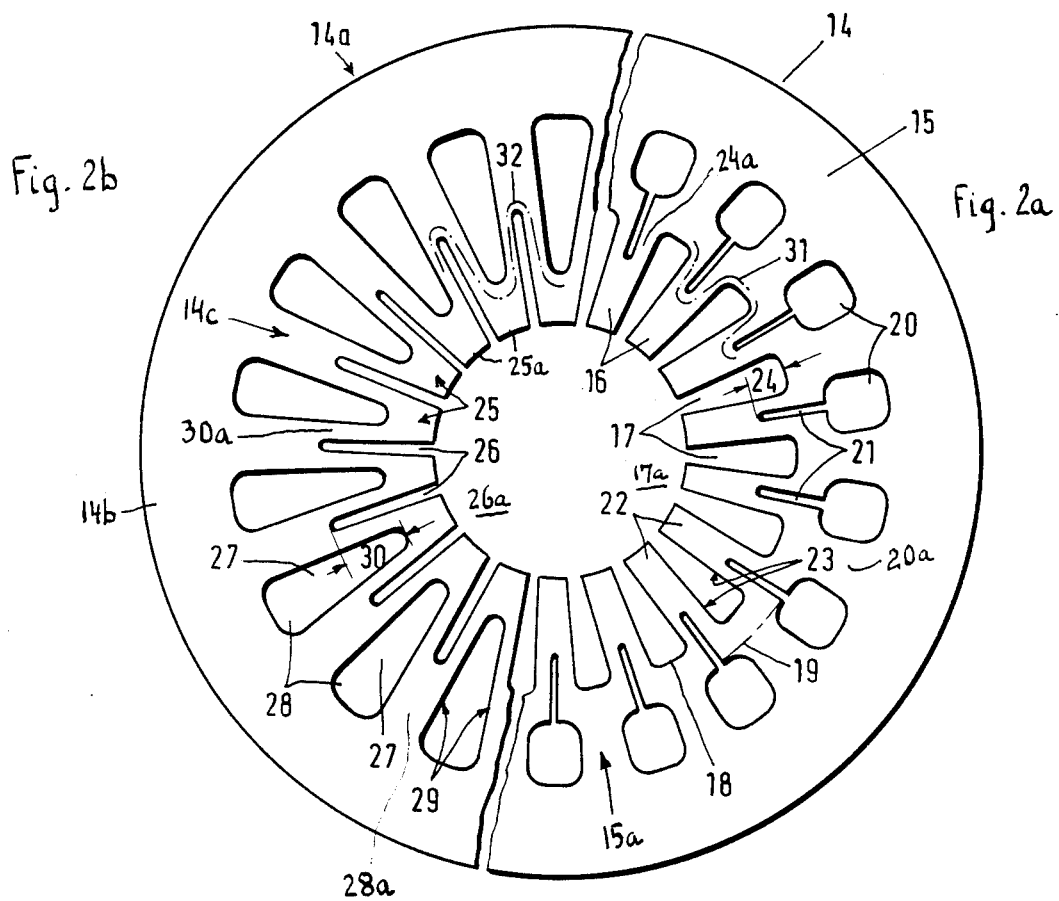
FIG. 2a is a fragmentary elevational view of a second diaphragm spring.
FIG. 2b is a fragmentary elevational view of a third diaphragm spring.

FIG. 2a shows approximately one-half of a diaphragm spring or cup spring 14 having a circumferentially complete outer marginal portion or rim 15 and a second portion 15a located inwardly of the rim 15, defining a substantially centrally located opening 17a and having an annulus of fingers or prongs 16 alternating with open slots 17 whose width increases radially outwardly, i.e., toward the annulus of holes 20 constituting the enlarged outer portions of closed slots whose inner portions 21 have a constant width and partially overlap the open slots 17, as considered in the radial direction of the spring 14. The inner end portions or tips 22 of the prongs 16 are immediately adjacent to the opening 17a. The radially outermost parts 18 of the outwardly diverging open slots 17 are located radially inwardly of the circle 19 defined by the innermost parts of the holes 20. The extent of overlap between the outer portions of open slots 17 and the inner portions 21 of the closed slots is shown at 24. The material of the inner portion 15a in the regions of overlap between the open and closed slots constitutes a circumferentially complete meandering or undulate zone acting not unlike an annular tension spring 31 which is integral with the ribs or webs 20a between the holes 20 as well as with the prongs 16. The inner portion 21 of each closed slot is flanked by the outer portions of the neighboring open slots 17. The inner portions 21 terminate short of the tips 22 of the prongs 16, i.e., they terminate radially outwardly of the centrally located opening 17a.

The taper of the edge faces 23 flanking the open slots 17 is selected in such a way that these faces are at least substantially parallel to the longitudinal extensions of inner portions 21 of the adjacent closed slots. This ensures that the width of bridges or lands 24a together constituting the tension spring 31 is at least substantially constant, as considered in the circumferential direction of the spring 14. The lands 24a can be said to constitute radially outermost parts of the prongs 16.

The diaphragm spring or cup spring 14a of FIG. 2b comprises a circumferentially complete outer marginal portion or rim 14b and a second portion 14c having an annulus of radially extending fingers or prongs 25 whose inner end portions or tips 25a surround a centrally located opening 26a communicating with radially extending open slots 26 which alternate with the prongs 25. The width of the open slots 26 is constant; however, the width of the inner portions 27 of the closed slots in the second portion 14c of the spring 14 increases radially outwardly toward the rim 14b so that the maximum width of the inner portion 27 matches the minimal width of the outer portion or hole 28 of the respective closed slot. The edge faces 29 bounding the inner portions 27 of the closed slots are at least substantially parallel to the neighboring open slots 26 so that the width of bridges or lands 30a in the region 30 where the open slots 26 overlap the inner portions 27 of the closed slots is at least substantially constant. The lands 30a form part of a meandering or undulate zone 32 which can be said to constitute a circumferentially complete tension spring forming part of the second portion 14c and being integral not only with the ribs or webs 28a between neighboring outer portions 28 but also with the prongs 25.

Figure 3:
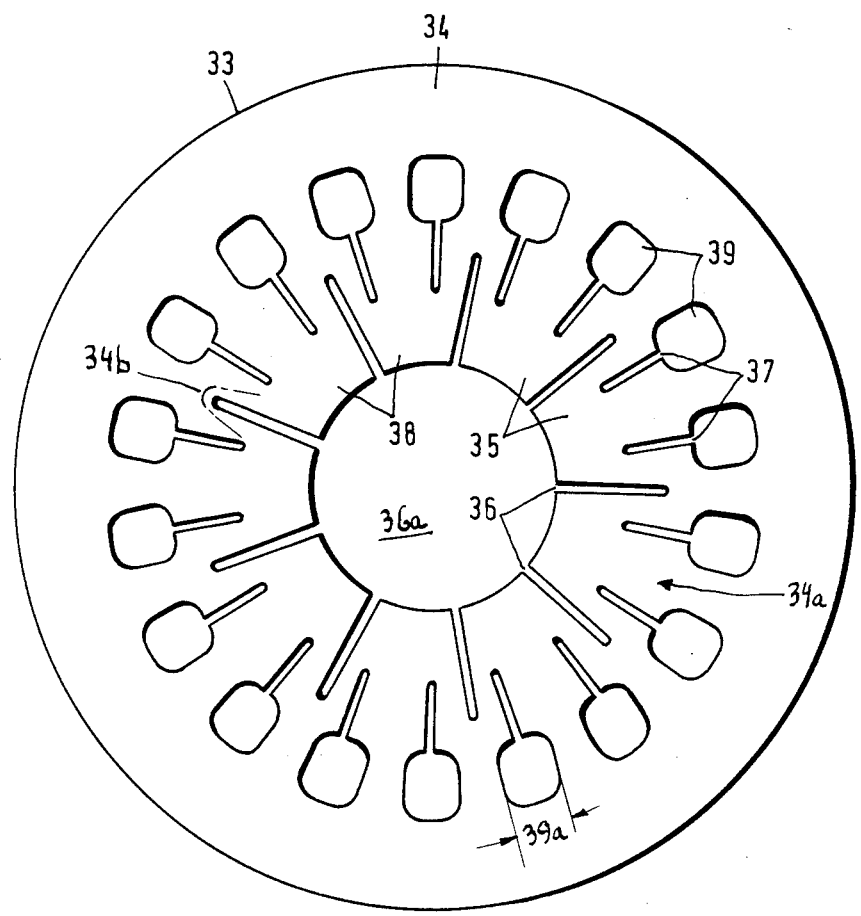
FIG. 3 is an elevational view of a fourth diaphragm spring wherein the number of closed slots exceeds the number of open slots.

The diaphragm spring or cup spring 33 of FIG. 3 has a circumferentially complete outer marginal portion or rim 34 and a second portion 34a defining a centrally located opening 36a and having an annulus of radially outwardly extending fingers or prongs 35 whose inner end portions or tips 38 surround the opening 36a and which are separated from one another by radially outwardly extending open slots 36 of constant width. The width of the prongs 35 increases radially outwardly toward the annulus of enlarged outer portions or holes 39 forming part of closed slots whose inner portions 37 are narrow slots of constant width extending in at least substantial parallelism with the adjacent open slots 36. The outermost parts of the open slots 36 are located radially outwardly of the innermost parts of inner portions 37 of the closed slots. The width 39a of each hole 39 greatly exceeds the width of an inner portion 37 and/or the width of an open slot 36. In the embodiment of FIG. 3, the number of closed slots exceeds the number of open slots 36 so that each pair of neighboring open slots 36 flanks the inner portions 37 of two closed slots. The innermost parts of inner portions 37 of the closed slots terminate short of the opening 36a, i.e., short of the tips 38 of the prongs 35; this causes the formation of a circumferentially complete annular tension spring or meandering zone 34b which includes the bridges or lands in the region of overlap between the inner portions 37 of the closed slots and the outer portions of the open slots 36.

The invention is based on the recognition that, even though a diaphragm spring can store (not only statically but also dynamically) maximum amounts of elastic energy per unit of volume, heretofore known diaphragm springs are far from ideal because elastic energy can be stored practically exclusively in the circumferentially complete outer marginal portion or rim, namely, in that portion of the spring which is located radially outwardly of the enlarged outer portions of slots between neighboring prongs. In other words, only a relatively small percentage of the material of a conventional diaphragm spring is used for such purposes. The simplest mode of enhancing the working capacity or ability of a diaphragm spring is to increase the width of the rim, as considered in the radial direction of the spring, and/or to increase the thickness of the spring. Such technique cannot be resorted to under any and all circumstances where a diaphragm spring is put to use because this would adversely influence the so-called $h_o/s$ ratio wherein $h_o$ is the so-called spring distance which the spring must cover in order to be converted from a hollow frustoconical body into a flat body, and s is the thickness of the spring. An unsatisfactory $h_o/s$ ratio would result in a change of the spring characteristic and in a reduction of useful life of a diaphragm spring, especially of a dynamically stressed diaphragm spring.

The improved diaphragm spring is characterized in that it can generate greater forces without increasing the quantity of material therein, i.e., the spring can store larger quantities of energy or, alternatively, the spring can store the same quantities of energy as a conventional diaphragm spring even though the quantity of its material is a fraction of that in a heretofore known diaphragm spring. Furthermore, the useful life of the improved diaphragm spring is longer than that of conventional springs, and the improved spring can exhibit spring characteristics which cannot be achieved with heretofore known springs.

The aforediscussed design of the improved diaphragm spring ensures that the second portion (i.e., the portion which in FIG. 1 is formed with the prongs 4) need not merely perform the function of a lever but can be utilized for storage of additional energy. The zone which stores additional energy forms a meandering annulus extending along the outer ends of the inner slots and the inner ends of the outer slots. The part which is capable of storing additional energy includes portions of the webs between the enlarged outer portions of the closed slots and portions of the prongs. Thus, by the simple expedient of departing from a diaphragm spring design wherein the slots flanking the prongs extend all the way from the central opening to the circumferentially complete rim, one can ensure that the spring portion, which in heretofore diaphragm springs merely performed the function of a composite lever, is now capable of storing substantial additional quantities of energy when the conicity of the diaphragm spring is changed counter to the direction of its force and by varying the spacing between the neighboring prongs. Otherwise stated, whenever the conicity of the improved diaphragm spring changes, the material of the meandering zone is subjected to stresses with attendant generation of additional tension which results in storage of energy in addition to that stored in the rim.

Another important advantage of the improved diaphragm spring is that no appreciable additional stressing or tensioning of the rim takes place when the conicity of the spring is changed. This is achieved by the aforediscussed distribution and orientation of various slots, as considered in the circumferential direction of the spring, so that portions of the meandering zone can resile independently of one another. In other words, the slots ensure that the meandering zone can exhibit a certain amount of springiness (as considered in the circumferential direction of the spring) independently of the rim. Such characteristics of the spring are believed to be attributable to the provision of slots which not only enable the meandering zone to flex relative to the rim but also allow for flexing of discrete sections of the meandering zone relative to the other section or sections.

Since the novel design of the second portion enables the latter to store additional energy without causing additional stressing and/or tensioning of the rim, the quantity of material which is used for the making of the improved spring can be reduced to a fraction of the quantity of material which is needed to construct a conventional diaphragm spring capable of storing the same quantity of energy. More specifically, it is possible to reduce the thickness of the improved diaphragm spring to a fraction of the thickness of a conventional diaphragm spring wherein the rim stores the same quantity of energy as the rim plus the second portion of the improved spring.

As stated above, an important advantage of the improved diaphragm spring is that the prongs (i.e., those parts of the spring which, in a conventional spring, merely perform the function of levers) also serve to store energy in addition to that which is stored by the rim. As also stated above, the additional energy storing portion includes the bridges in the regions of overlap between the open slots and the closed slots of the spring. The reason for the ability of the aforediscussed meandering zones to store energy is that, when the conicity of the diaphragm spring changes against the direction of its force, the tips of the prongs move nearer to one another. This means that the material in the region of overlap between the open and closed slots is subjected to stresses tending to flex the spring about an axis which is normal to its surface. A change in the conicity of the spring also entails the generation of twisting or torsional stresses upon the material in the regions of overlap between the open and closed slots. The composite stresses which are the resultant of the just discussed flexing and torsional stresses provide the capacity to store energy in addition to that which is stored in the outer marginal portion or rim of the improved spring.

The enlarged outer portions of the closed slots in the diaphragm spring of the present invention can assume a circular, elliptical or other shape. For example, and as shown in FIGS. 1, 2a and 3, the enlarged outer portions of the closed slots can be slightly elongated in the radial direction of the diaphragm spring. The exact configuration of the outer portions and/or inner portions of the closed slots will depend on a number of factors, such as the intended use of the diaphragm spring and/or others. If the diaphragm spring is used in a friction clutch, the enlarged outer portions of its closed slots can be used to receive portions of fasteners which secure the spring to a cover or to another part of the clutch, and the dimensions and configuration of the enlarged outer portions will depend on the dimensions and cross-sectional configuration of such fasteners.

The feature that the outer diameter of the annulus formed by the enlarged outer portions of the closed slots exceeds or may exceed the outer diameter of the annulus of open slots by at least 15 percent has been found to be desirable and advantageous irrespective of the exact configuration of the enlarged outer portions. This prevents excessive flexing of the prongs.

The relationship between the width of the inner portions and the width of the enlarged outer portions of the closed slots can be changed within a rather wide range. It has been found that, in many instances, the width of the inner portions of the closed slots should be a small fraction of the width of the corresponding outer portions.

It has further been found that the work capacity of the improved diaphragm spring can be increased by the simple expedient by appropriate selection of configuration of its open and/or closed slots, for example, by configurating the slots in such a way that those portions of the open slots which overlap the closed slots, and those portions of the neighboring closed slots which overlap the open slots, are at least substantially parallel to one another. However, in many instances (e.g., if one desires to achieve certain specific flexibility or rigidity of the prongs), it may be advantageous and desirable if the surfaces or edge faces which bound the open slots are at least substantially parallel to the inner portions of the closed slots, at least in the regions of overlap between the open and closed slots (this can be seen in FIGS. 2a and 2b). This ensures that the width of the bridges or lands in the regions of overlap between the open and closed slots is at least substantially constant.

To a certain extent, the circumferentially complete tension spring which is formed as a result of the provision of open and closed slots and is located in the regions of overlap between such slots resembles the spring which is disclosed in German Utility Model No. 1,752,253. However, the improved diaphragm spring is designed in such a way that the energy which is stored by the circumferentially complete annular tension spring is added to the energy which is stored in the circumferentially complete outer marginal portion or rim of the diaphragm spring. Moreover, the tension spring is integral with the outer marginal portion of the improved spring, i.e., these two components of the improved diaphragm spring are permanently joined by the aforediscussed webs or ribs which alternate with the enlarged outer portions of the closed slots.

Figure 4:
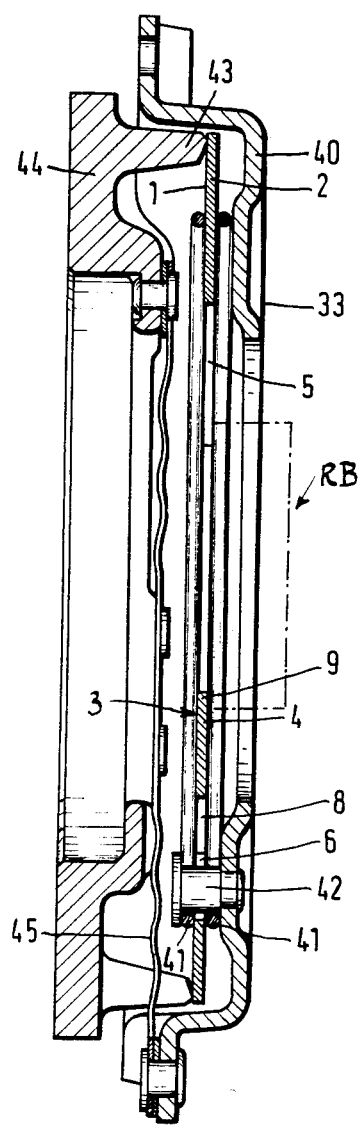
FIG. 4 is an axial sectional view of a friction clutch which employs the diaphragm spring of FIG. 1.

FIG. 4 shows a friction clutch 33 which comprises a diaphragm spring 1 of the type shown in FIG. 1 and disposed between two ring-shaped seats 41 at the inner side of a cover or housing 40. The fastener means for securing the seats 41 and the diaphragm spring 1 to the cover 40 comprises rivets 42 whose shanks extend through the holes 6 of closed slots in the spring 1. The rim 2 of the spring 1 bears against an annulus of projections 43 forming part of an axially movable pressure plate 44 which is adapted to be urged against the friction coating at one side of a clutch plate or disc (not shown) located to the left of the pressure plate 44. The other side of the clutch plate or disc is adjacent to a torque transmitting element, e.g., to the flywheel on the crankshaft of the engine in an automotive vehicle. The reference character 45 denotes one of several leaf springs which are provided to transmit torque between the pressure plate 44 and the cover 40.

The design of the second portion 3 of the diaphragm spring 1 is identical with that of the portion 3 of the diaphragm spring shown in FIG. 1, i.e., the inner portions 8 of the closed slots partially overlap the open slots 5 between the prongs 4. The tips 9 of the prongs 4 surround the opening 5a. The tips 9 of the prongs 4 can be engaged by an actuating device, such as a release bearing RB which can cause the spring 1 to tilt or pivot between the seats 41 and to thereby move its rim 2 in a direction to the right, as viewed in FIG. 4, so that the pressure plate 44 can move in the same direction and relaxes the pressure upon the clutch plate which becomes disengaged from the flywheel.

It is clear that the friction clutch of FIG. 4 can employ the diaphragm spring 14, 14a or 33 in lieu of the spring 1.

Figure 5:
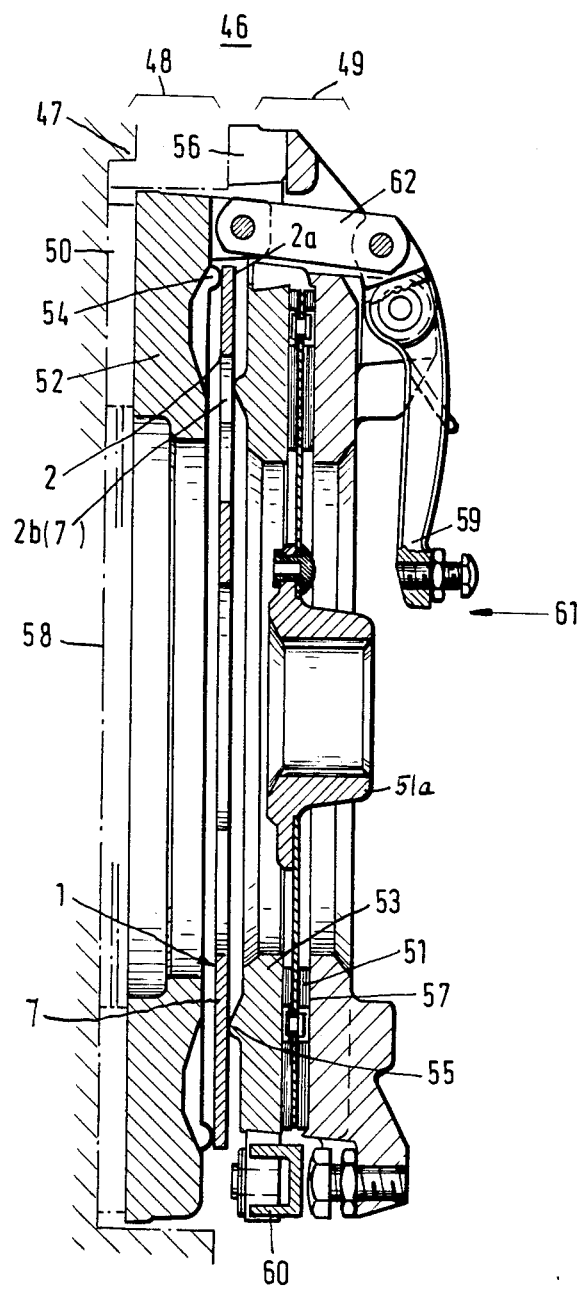
FIG. 5 is an axial sectional view of a multiple-disc friction clutch which employs the diaphragm spring of FIG. 1.

The friction clutch 46 which is shown FIG. 5 is a multiple-disc or multiple-plate clutch with two clutch discs or clutch plates 50 and 51 flanking two pressure plates 52, 53 which are disposed at the opposite sides of a diaphragm spring 1 of the type shown in FIG. 1. The entire clutch 46 is mounted on a flywheel 47 which is secured to the shaft of a prime mover, e.g., to the crankshaft of an internal combustion engine in an automotive vehicle.

The clutch 46 comprises a first clutch unit 48 which serves to establish a torque transmitting connection between the flywheel 47 and a shaft (not shown) which is driven by the clutch plate 50; such shaft can constitute the input shaft of a change-speed transmission in an automotive vehicle. The clutch 46 further comprises a second clutch unit 49 which can establish a torque transmitting connection between the flywheel 47 and a power take-off which receives torque from the clutch plate 51, namely, from a hub 51a which constitutes an element of the clutch plate 51. The pressure plate 52 forms part of the clutch unit 48 and comprises several projections 54 which are normally engaged by the outermost part 2a of the rim 2 forming part of the diaphragm spring 1. The clutch unit 49 includes the aforementioned pressure plate 53 which is provided with projections 55 engaging the webs or ribs 7 between the holes 6 (not shown in FIG. 5) of closed slots in the diaphragm spring 1. In the illustrated (flattened) condition, the diaphragm spring 1 causes the pressure plate 52 to bear against the right-hand friction coating of the clutch plate 50 whereby the left-hand friction coating of the clutch plate 50 bears against the right-hand side or surface 58 of the flywheel 47 so that the clutch plate 50 drives the input shaft of the transmission. At the same time, the spring 1 biases the pressure plate 53 against the left-hand friction coating of the clutch plate 51 so that the right-hand friction coating of this clutch plate bears against the adjacent surface 57 of a cover or housing 56 which rotates with the flywheel 47. This causes the hub 51a to drive the aforementioned power take-off or any other device which should receive torque when the flywheel 47 rotates and the clutch unit 49 is engaged.

The cover or housing 56 is common to the clutch units 48 and 49; it is secured to the flywheel 47 by a set of screws or by other suitable fastener means.

The means for actuating the clutch 46 comprises a first set of three equidistant levers 59 and a second set of equidistant levers 60. The levers 59 are pivotally mounted on the cover 56 and their outer arms are articulately connected with links 62 which are further articulately connected with the pressure plate 52. When the inner arms of the levers 59 are shifted in the direction indicated by the arrow 61, the pressure plate 52 is pulled away from the clutch plate 50 so that the latter ceases to receive torque from the flywheel 47 and the clutch plate 50 then ceases to drive the input shaft of the change-speed transmission. The levers 60 are two-armed levers serving to lift the pressure plate 53 of the clutch unit 49 off the clutch plate 51 so that the latter is incapable of receiving torque from the cover 56 on disengagement of the clutch unit 48, i.e., the hub 51a then ceases to drive the power take-off. The manner in which the levers 60 can disengage the clutch unit 49 in response to disengagement of the clutch unit 48 by the levers 59 and links 62 is disclosed, for example, in German Offenlegungsschrift No. 3,004,277.

The diaphragm spring 1 of FIG. 5 is preferably identical with the spring of FIG. 1. As mentioned above, the outermost part 2a of the rim 2 bears against the projections 54 of the pressure plate 52 in the clutch unit 48 when the latter transmits torque from the flywheel 47 to the clutch plate 50. The portion 2b of the diaphragm spring 1 shown in FIG. 5 includes the ribs or webs 7 between the enlarged outer portions or holes of closed slots in the spring 1.

When the clutch units 48 and 49 are disengaged, the diaphragm spring 1 resembles a hollow cone because the part 2a of the rim 2 is shifted to the right of the position shown in FIG. 5 and the part 2b is shifted to the left of the position shown in FIG. 5.

It is clear that the multiple-disc clutch 34 of FIG. 5 can utilize the diaphragm spring 14, 14a or 33 in lieu of the illustrated diaphragm spring 1.

Figure 6:
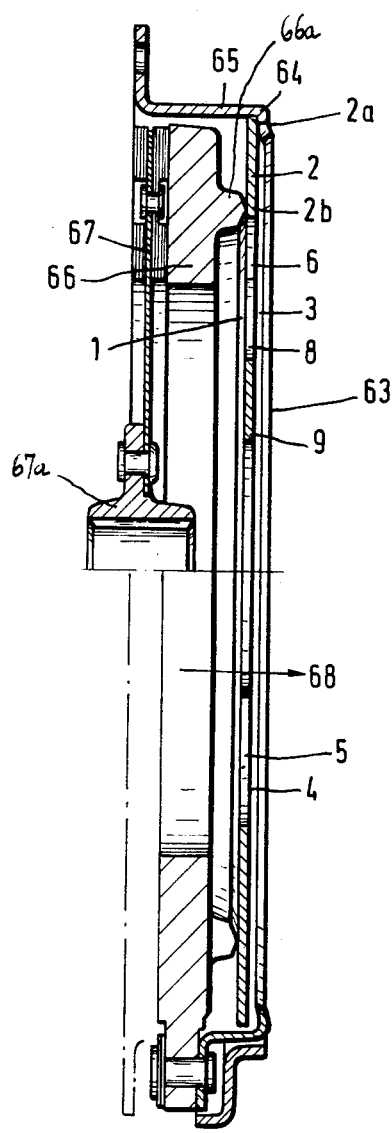
FIG. 6 is an axial sectional view of a third friction clutch which employs the diaphragm spring of FIG. 1.

FIG. 6 illustrates a so-called pull clutch which employs a diaphragm spring 1 having prongs 4 whose tips 9 must be pulled or pushed in the direction of arrow 68 in order to disengage the clutch, namely, to move (or to permit the movement of) a pressure plate 66 away from a clutch plate 67 which normally bears against a flywheel (not shown). The hub 67a of the clutch plate 67 can transmit torque to the input shaft of a transmission or to another driven part, not shown. The flywheel is attached to a clutch cover or housing 65 having a seat 64 for the outermost part 2a of the rim 2 of the diaphragm spring 1. The part 2b of the spring 1 engages with projections 66a of the pressure plate 66. The second part 3 of the spring 1 includes the prongs 4 which are separated from each other by radially extending open slots 5, the same as in the spring 1 of FIG. 1. When the tips 9 of the prongs 4 are moved in the direction of arrow 68, the spring 1 pivots relative to the projections 66a of the pressure plate 66 and moves the outermost part 2a of the rim 2 away from the seat 64 of the cover 65. This interrupts the transmission of torque from the flywheel to the clutch plate 67 and its hub 67a. The part 2b of the spring 1 shown in FIG. 6 may be constituted by the ribs between the enlarged outer portions 6 of the closed slots or it may constitute the innermost part of the rim 2. The inner portions 8 of closed slots in the spring 1 of FIG. 6 extend radially inwardly toward but short of the tips 9 of the prongs 4. The inner portions 8 partially overlap the open slots 5, as considered in the radial direction of the spring 1. Each inner portion 8 is located between a pair of neighboring open slots 5.

If desired, the diaphragm spring 1 of FIG. 6 can be replaced with the diaphragm spring 14, 14a or 33.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A friction clutch, comprising a cover; a pressure plate; a pair of annular seats between said cover and said pressure plate; a diaphragm spring disposed between said seats and having a circumferentially complete outer marginal portion located radially outwardly of said seats and engaging with said pressure plate, said spring further comprising a second portion having a plurality of holes adjacent said marginal portion, said second portion including webs alternating with said holes and said second portion further including a circumferentially complete tension spring integral with and disposed radially inwardly of said webs, said second portion defining a substantially centrally located opening and further comprising an annulus of prongs surrounding the opening and integral with said tension spring, said second portion also having a plurality of open slots having radially outermost portions and alternating with said prongs and said second portion further having closed slots having inner portions disposed radially outwardly of the outermost portions of said open slots; and fastener means extending through said holes and securing said spring to said cover.

2. A friction clutch, particularly a multiple-disc clutch, comprising a pair of axially movable pressure plates; a pair of clutch plates flanking said pressure plates; and a diaphragm spring disposed between said pressure plates and including a radially outermost marginal portion engaging one of said pressure plates, a second portion located radially inwardly of said marginal portion and engaging the other of said pressure plates, and a third portion located radially inwardly of said second portion and including an annulus of prongs having tips defining an opening, said spring further having open slots alternating with said prongs and closed slots including enlarged outer portions disposed inwardly of said marginal portion and outwardly of said open slots and inner portions extending inwardly from the respective outer portions toward but short of said opening, said outer portions constituting holes forming an annulus in said second portion and said second portion further including webs disposed between said holes and said second portion engaging said other pressure plate, said open slots overlapping the inner portions of said closed slots and each pair of neighboring open slots flanking at least one of said inner portions, as considered in the circumferential direction of the spring, at least one of said second and third portions including an annular tension spring which is integral with said webs.

3. A friction clutch, comprising a housing; a pressure plate; and a diaphragm spring disposed between said housing and said pressure plate and having a circumferentially complete outer marginal portion engaging said housing and a second portion engaging said pressure plate and having a plurality of holes adjacent said marginal portion, said second portion including webs alternating with said holes and said second portion further including a circumferentially complete tension spring integral with and disposed radially inwardly of said webs, said second portion defining a substantially centrally located opening and further comprising an annulus of prongs surrounding the opening and integral with said tension spring, said second portion having a plurality of open slots having radially outermost portions and alternating with said prongs and said second portion also having closed slots having inner portions disposed radially inwardly and outer portions disposed radially outwardly of the outermost portions of said open slots.

4. The friction clutch of claim 3, wherein each pair of neighboring open slots flanks at least one of said closed slots.

5. The friction clutch of claim 3, further comprising actuating means for flexing said spring relative to said pressure plate through the medium of said prongs.

6. A diaphragm spring, comprising a circumferentially complete outer marginal portion and a second portion having a plurality of holes adjacent said marginal portion, said second portion including webs alternating with said holes and said second portion further including a circumferentially complete tension spring integral with and disposed radially inwardly of said webs, said second portion defining a substantially centrally located opening and further comprising an annulus of prongs surrounding the opening and integral with said tension spring, said second portion having a plurality of open slots having radially outermost portions and alternating with said prongs and said second portion also having closed slots having inner portions disposed radially inwardly and outer portions disposed radially outwardly of the outermost portions of said open slots.

7. The diaphragm spring of claim 6, wherein the outer portions of said closed slots include said holes and the maximum width of the inner portion of each of said closed slots, as considered in the circumferential direction of the spring, is less than the maximum width of the respective outer portion.

8. The diaphragm spring of claim 7, wherein each of said outer portions has an innermost part and each of said inner portions has an outermost part, as considered in the radial direction of the spring, the width of each outermost part being at most equal to the width of the respective innermost part, as considered in the circumferential direction of the spring.

9. The diaphragm spring of claim 7, wherein the neighboring open and closed slots partially overlap each other and the width of said inner portions is at least substantially constant, as considered in the circumferential direction of the spring, at least in the regions of overlap between the neighboring open and closed slots.

10. The diaphragm spring of claim 7, wherein said outer portions form a first annulus having an inner diameter and said open slots form a second annulus having an outer diameter at most equal to said inner diameter.

11. The diaphragm spring of claim 6, wherein said outer portions form a first annulus having a first outer diameter and said open slots form a second annulus having a second outer diameter, said first outer diameter exceeding said second outer diameter by at least 15 percent.

12. The diaphragm spring of claim 6, wherein each of said outer portions includes one of said holes and the width of each of said inner portions is a small fraction of the width of the corresponding outer portion, as considered in the circumferential direction of the spring.

13. The diaphragm spring of claim 12, wherein the width of said inner portions is at least substantially constant.

14. The diaphragm spring of claim 6, wherein the width of said open slots is a small fraction of the width of said outer portions.

15. The diaphragm spring of claim 14, wherein the width of said open slots is at least substantially constant.

16. The diaphragm spring of claim 6, wherein said open slots partially overlap the neighboring closed slots and said prongs have a substantially constant width, as considered in the circumferential direction of the spring, at least in the regions where said open slots overlap the neighboring closed slots.

17. The diaphragm spring of claim 6, wherein said open slots partially overlap the neighboring closed slots and said second portion further comprises pairs of edge faces flanking said open slots, said inner portions being at least substantially parallel to the edge faces in the neighboring open slots, at least in the regions of overlap between said open and closed slots.

18. The diaphragm spring of claim 6, wherein the number of said closed slots exceeds the number of said open slots.

19. The diaphragm spring of claim 18, wherein each pair of neighboring open slots flanks a plurality of closed slots.

* * * * *